No. 738,271. PATENTED SEPT. 8, 1903.
D. ASTLE.
IRRIGATING APPARATUS.
APPLICATION FILED JUNE 30, 1902.
NO MODEL.

Witnesses
C. H. Walker
H. Joseph Doyle

Inventor.
David Astle,
By Wm. S. Hodges
Attorney

UNITED STATES PATENT OFFICE.

DAVID ASTLE, OF VINELAND, NEW JERSEY.

IRRIGATING APPARATUS.

SPECIFICATION forming part of Letters Patent No. 738,271, dated September 8, 1903.

Application filed June 30, 1902. Serial No. 113,777. (No model.)

*To all whom it may concern:*

Be it known that I, DAVID ASTLE, of Vineland, in the county of Cumberland and State of New Jersey, have invented certain new and useful Improvements in Irrigating Apparatus; and I do hereby declare the following to be a full, clear, and exact description of the invention, such as will enable others skilled in the art to which it appertains to make and use the same.

This invention relates to certain new and useful improvements in irrigating apparatus.

The invention has for its object the production of a simple and inexpensive portable system of this character by means of which growing crops located in different parts of the same farm-land may be effectively and conveniently watered and the ground prevented from becoming parched or hardened in dry weather.

In carrying out my invention I employ a central reservoir from which leads a main supply-pipe, provided with branch pipes distributed over the land to be watered. Each branch pipe is provided with a series of valved plugs or nipples, to which is attached a hose or other flexible coupling of a portable spraying apparatus. Said spraying apparatus comprises a distributing-pipe mounted upon suitable trucks and provided with a series of spraying-nozzles arranged to discharge the water upon plants and the ground in the immediate vicinity.

The invention will be hereinafter fully set forth, and particularly pointed out in the claims.

Figure 1:
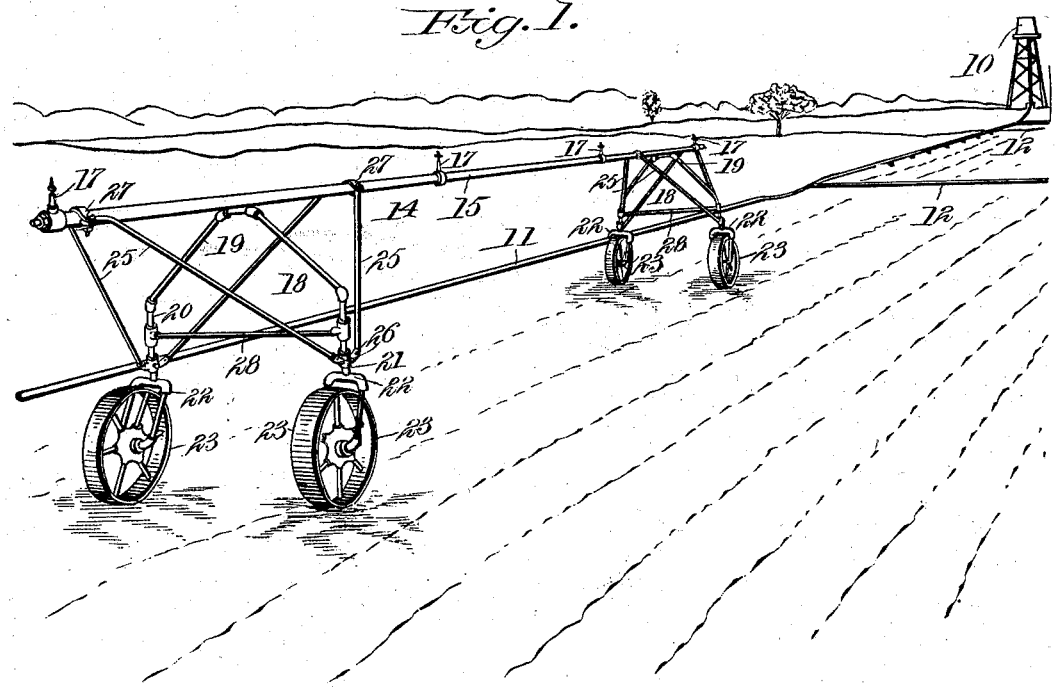
Figure 2:
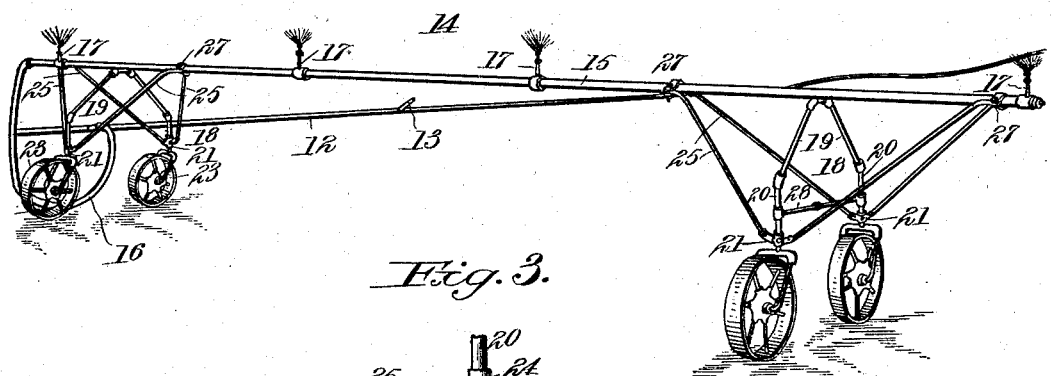
Figure 3:
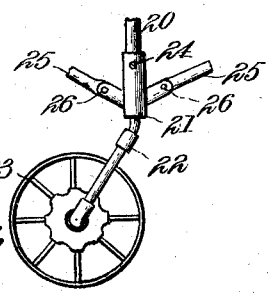

In the accompanying drawings, Figure 1 is a view in perspective illustrating my invention. Figure 2 is a view of the portable spraying apparatus. Fig. 3 is a detail.

Referring to the drawings, 10 designates a tank or reservoir supplying a main pipe 11 and lateral branch pipes 12, the latter being provided with laterally-inclined spaced-apart valved nipples 13.

The spraying apparatus 14 comprises a pipe 15, designed to be connected to any one of the valved nipples 13 by means of a hose 16, coupled to one end thereof, said pipe having spaced-apart spraying-nozzles 17. The pipe 15 is supported at each end by a skeleton truck 18, said trucks each comprising an approximately inverted-V-shaped support 19, the depending members 20 of which telescope with members 21, supporting the swiveled yokes 22, in which are mounted carrying wheels or casters 23. The telescoping members are held in rigid relation by means of set-screws 24 or the like. Extending from both sides of the members 21 are brace-rods 25, which are hinged at 26, the upper ends of said rods converging, clamps 27 being arranged to embrace pipe 15, whereby said pipe is supported in position on said trucks. The depending members 20 are also braced by means of a rod 28.

In practice the spraying apparatus may be easily transported from place to place about the tract of land which is to be watered and coupled with any one of the valved nipples 13. The water is then turned on and sprayed by means of the nozzles 17, reaching the ground and plants in much the same form as a fine rain. When the desired degree of moisture has been obtained, the water is shut off and the spraying apparatus moved to the next nipple 13, and so on until the entire tract has been watered.

The advantages of my invention are at once apparent, and it will be particularly observed that by means of the telescoping members of the trucks the height of the spraying apparatus may be regulated to suit the height of different crops. I have also found in practice that double the number of plants may be raised on a given piece of ground by employing my apparatus as compared to the number that can be raised where reliance is placed on the rainfall alone.

I am aware that irrigating systems have heretofore been employed comprising a main pipe and lateral pipes leading therefrom provided with spraying-nozzles, and I do not claim the same. So far as I am aware, however, I am the first to employ an irrigating apparatus comprising a main pipe and branch pipes leading therefrom, said branch pipes being provided with spaced-apart nipples, whereby a portable spraying-machine can be connected at convenient intervals for the purpose of watering growing crops.

I claim as my invention—

1. An irrigating apparatus comprising independent trucks formed with telescoping members, carrying-wheels mounted in said members, a spray-pipe, and means for securing said pipe on said truck, as set forth.

2. An irrigating apparatus comprising independent trucks having depending members, yokes telescoping with said members, carrying-wheels mounted in said yokes, a spray-pipe mounted on said trucks, and brace-rods extending from said depending members to said pipe and serving to hold the latter in position, as set forth.

3. An irrigating apparatus comprising independent trucks formed with telescoping members, a pipe resting on said trucks and carrying spraying devices, and adjustable brace-rods extending from said telescoping members to said pipe and serving to hold the latter in position, as set forth.

4. An irrigating apparatus comprising independent trucks, means for adjusting the height of said trucks, a pipe resting on said trucks and carrying spraying devices, and brace-rods pivoted to said trucks and connected with said pipe, whereby the latter is held in position.

5. An irrigating apparatus comprising independent trucks, means for adjusting the height of said trucks, a pipe resting on said trucks and carrying spraying devices, clamps adjustably mounted on said pipe, and brace-rods pivoted to said trucks and connected to said clamps, whereby said pipe is held in position, as set forth.

In testimony whereof I have signed this specification in the presence of two subscribing witnesses.

DAVID ASTLE.

Witnesses:
FRANK DE LUEV,
N. HENRY STEVENS.